US012323531B2

(12) United States Patent
Kozakura

(10) Patent No.: US 12,323,531 B2
(45) Date of Patent: Jun. 3, 2025

(54) COMMUNICATION APPARATUS AND COMMUNICATION METHOD TO CHECK DATA AND PUBLISH A CHECK RESULT IN A BLOCKCHAIN NETWORK

(71) Applicant: FUJITSU LIMITED, Kawasaki (JP)

(72) Inventor: Fumihiko Kozakura, Hachioji (JP)

(73) Assignee: FUJITSU LIMITED, Kawasaki (JP)

( * ) Notice: Subject to any disclaimer, the term of this patent is extended or adjusted under 35 U.S.C. 154(b) by 355 days.

(21) Appl. No.: 17/351,629

(22) Filed: Jun. 18, 2021

(65) Prior Publication Data

US 2022/0103372 A1 Mar. 31, 2022

(30) Foreign Application Priority Data

Sep. 28, 2020 (JP) .................. 2020-162429

(51) Int. Cl.
H04L 9/32 (2006.01)
H04L 9/08 (2006.01)
H04L 9/00 (2022.01)

(52) U.S. Cl.
CPC .......... *H04L 9/3247* (2013.01); *H04L 9/0825* (2013.01); *H04L 9/3236* (2013.01); *H04L 9/50* (2022.05)

(58) Field of Classification Search
CPC ... H04L 9/3247; H04L 9/0825; H04L 9/3236; H04L 9/50; H04L 9/3239; H04L 63/123; G06F 21/64
See application file for complete search history.

(56) References Cited

U.S. PATENT DOCUMENTS

| 5,966,445 | A | 10/1999 | Park et al. |
| 8,359,645 | B2 * | 1/2013 | Kramer ................... H04L 69/40 |
| | | | 726/22 |
| 10,922,423 | B1 * | 2/2021 | Rungta ................. G06F 21/604 |
| 2010/0305997 | A1 * | 12/2010 | Ananian ............ G06Q 10/0633 |
| | | | 715/843 |
| 2017/0366525 | A1 * | 12/2017 | Takagi ................ H04L 63/0442 |
| 2018/0096121 | A1 | 4/2018 | Goeringer et al. |
| 2018/0365688 | A1 | 12/2018 | He et al. |

(Continued)

FOREIGN PATENT DOCUMENTS

| JP | 2004-129303 | 4/2004 |
| JP | 2013-149170 | 8/2013 |

(Continued)

OTHER PUBLICATIONS

Extended European Search Report issued Nov. 24, 2021 from European Patent Application No. 21179900.2, 8 pages.

(Continued)

*Primary Examiner* — David J Pearson
(74) *Attorney, Agent, or Firm* — STAAS & HALSEY LLP

(57) ABSTRACT

A non-transitory computer-readable recording medium has stored therein a program that causes a computer to execute a process. The process includes acquiring a check program for checking data processing on data from a server in a blockchain network, executing the check program, giving a first signature of the server to a check result generated by executing the data processing during the execution of the check program, and publishing the check result with the first signature in the blockchain network.

11 Claims, 11 Drawing Sheets

(56) References Cited

U.S. PATENT DOCUMENTS

| | | | |
|---|---|---|---|
| 2019/0220858 A1* | 7/2019 | Weight | G06Q 20/389 |
| 2019/0253245 A1* | 8/2019 | Zhang | H04L 9/0637 |
| 2019/0279206 A1* | 9/2019 | Song | G06F 16/1834 |
| 2020/0104296 A1* | 4/2020 | Hunn | G06F 16/27 |
| 2020/0117730 A1 | 4/2020 | Vaswani et al. | |
| 2020/0153605 A1 | 5/2020 | Hu et al. | |
| 2020/0159697 A1 | 5/2020 | Wood et al. | |
| 2020/0322132 A1* | 10/2020 | Covaci | H04L 9/3218 |
| 2020/0379981 A1* | 12/2020 | Yoon | G06F 16/2379 |
| 2020/0382276 A1* | 12/2020 | Umemoto | H04W 4/80 |
| 2020/0382536 A1* | 12/2020 | Dherange | G06F 16/906 |
| 2020/0382560 A1* | 12/2020 | Woolward | H04L 63/205 |
| 2021/0042112 A1* | 2/2021 | Covaci | G06F 9/3826 |
| 2021/0135854 A1* | 5/2021 | Karame | G06Q 20/3678 |
| 2021/0326484 A1* | 10/2021 | Zeng | G06F 21/64 |
| 2021/0365433 A1* | 11/2021 | Heo | G06F 16/2365 |
| 2022/0029820 A1* | 1/2022 | Mozano | H04L 9/0891 |
| 2022/0272087 A1* | 8/2022 | Omori | H04L 63/0823 |

FOREIGN PATENT DOCUMENTS

| | | |
|---|---|---|
| JP | 2018-139078 | 9/2018 |
| JP | 2019-4463 | 1/2019 |

OTHER PUBLICATIONS

Office Action dated Jan. 9, 2024 issued in corresponding Japanese Patent Application No. 2020-162429.
European Office Action dated Jun. 25, 2024 for European Application No. 21179900.2.

\* cited by examiner

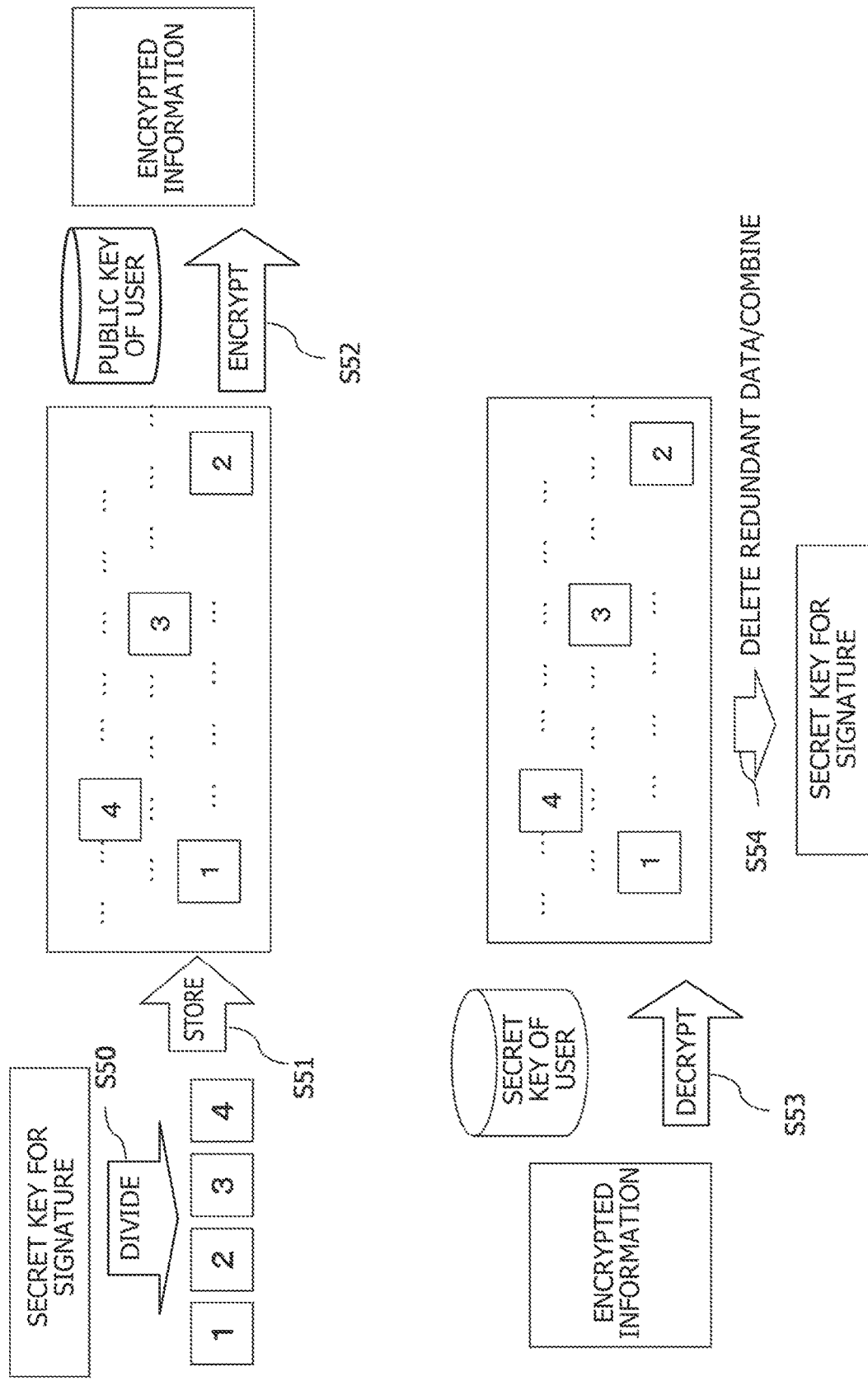

COMMUNICATION APPARATUS AND COMMUNICATION METHOD TO CHECK DATA AND PUBLISH A CHECK RESULT IN A BLOCKCHAIN NETWORK

CROSS-REFERENCE TO RELATED APPLICATION

This application is based upon and claims the benefit of priority of the prior Japanese Patent Application No. 2020-162429, filed on Sep. 28, 2020, the entire contents of which are incorporated herein by reference.

FIELD

The embodiments discussed herein are related to a communication apparatus and a communication method.

BACKGROUND

In recent years, a blockchain in which a plurality of computers (blockchain nodes) are synchronized with each other and share histories of data transactions and modifications has attracted attention. The blockchain node includes, for example, a history database called a distributed ledger, writes a history related to data in the distributed ledger, and synchronizes the written distributed ledger with other blockchain nodes, thereby sharing an equivalent distributed ledger between the blockchain nodes.

Examples of related art include U.S. Patent Publication No. 2018/0096121, Japanese Laid-open Patent Publication No. 2013-149170, and Japanese Laid-open Patent Publication No. 2019-4463.

SUMMARY

According to an aspect of the embodiments, a non-transitory computer-readable recording medium has stored therein a program that causes a computer to execute a process, the process including acquiring a check program for checking data processing on data from a server in a blockchain network, executing the check program, giving a first signature of the server to a check result generated by executing the data processing during the execution of the check program, and publishing the check result with the first signature in the blockchain network.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 11 is a diagram illustrating an example of a method of concealing a secret key.

DESCRIPTION OF EMBODIMENTS

In order to reduce a burden on a blockchain node coupled to a blockchain network, a part of processing may be processed by a sub-chain. The sub-chain is a local network that corresponds to a blockchain node, and is installed, for example, under the blockchain by a business operator that manages the blockchain.

Even when data is processed in a sub-chain, a history of data processing is stored over a blockchain. However, the processing in the sub-chain is processing that is executed without publication by the business operator of the blockchain. For this reason, whether processing details indicated in the history are correct or not is determined only by trusting the business operator, and reliability may be low.

First Embodiment

A first embodiment is described.

Configuration Example of Communication System 1

Figure 1:
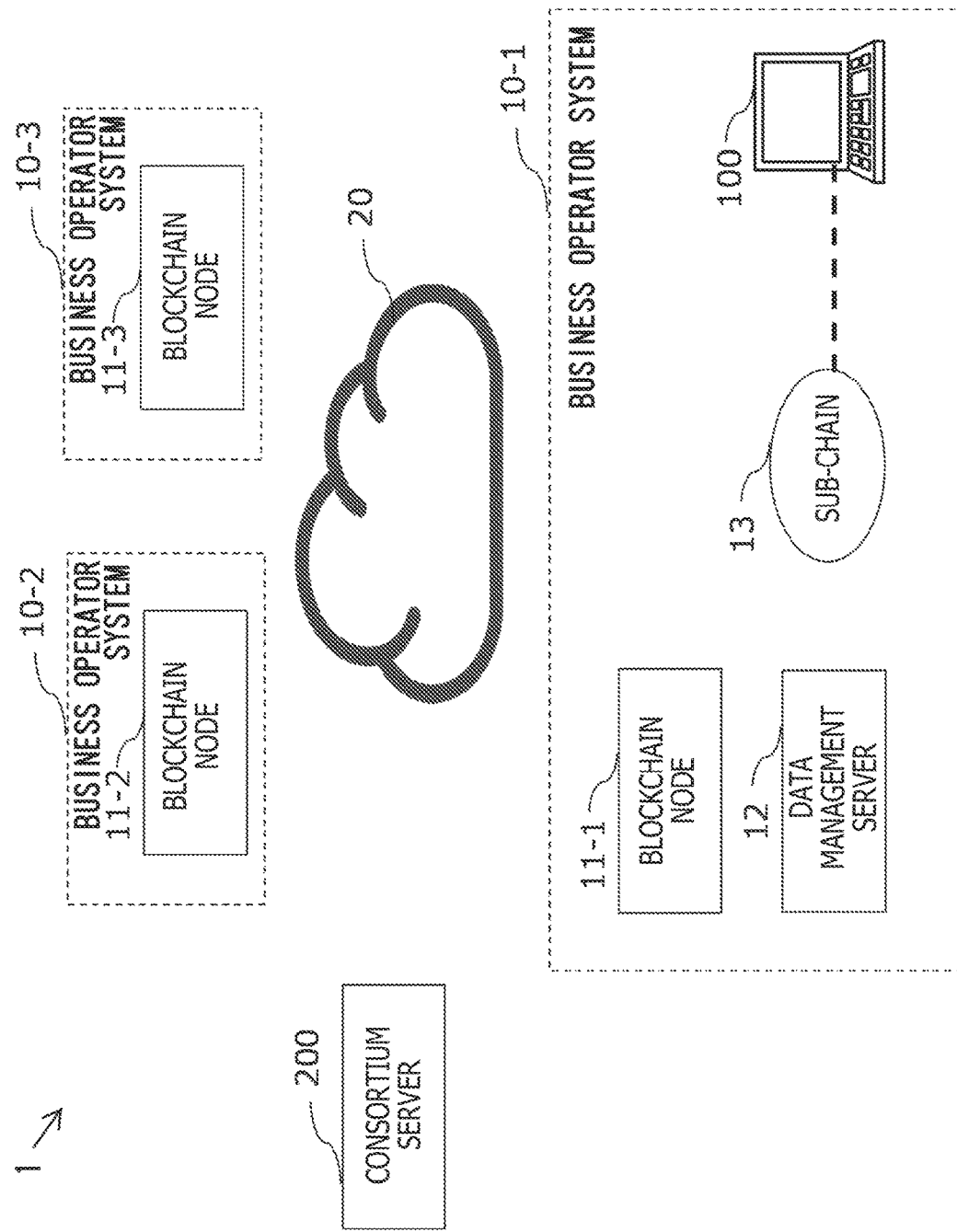
FIG. 1 is a diagram illustrating a configuration example of a communication system.

FIG. 1 is a diagram illustrating a configuration example of a communication system 1. The communication system 1 includes business operator systems 10-1 to 10-3 (hereinafter, each may be referred to as a business operator system 10), a consortium server 200, and a blockchain network 20. The communication system 1 is a communication network that employs a blockchain.

The business operator systems 10-1 to 10-3 include blockchain nodes 11-1 to 11-3 (hereinafter, each may be referred to as a blockchain node 11), respectively. The business operator system 10 communicates, by using the blockchain node 11, with another blockchain node 11 via the blockchain network 20. The business operator system 10 uses the blockchain node 11 to perform publication or transaction of data with other business operator systems 10. For example, the business operator system 10 includes a distributed ledger in the blockchain node 11, and stores a history of processing on data (hereinafter, may be referred to as data processing) such as generation, publication, transaction, and modification of data in the distributed ledger. The business operator system 10 shares the distributed ledger having the same details with the other business operator systems 10 by synchronizing the distributed ledger with the other business operator systems 10.

The business operator system 10-1 includes a local network. The local network includes, for example, a data management server 12, a sub-chain network 13, and a sub-chain node 100. The data management server 12 is coupled to the blockchain node 11-1, and acquires data from the blockchain node 11-1 (check-out) and delivers data to the blockchain node 11-1 (check-in). The sub-chain network 13 is a network different from the blockchain network 20, and is, for example, a local network. The sub-chain node 100 is a communication apparatus that performs communication via the sub-chain network 13. The sub-chain node 100 performs data processing such as acquiring data from the data management server 12, modifying the acquired data, and delivering the modified data to the data management server 12. The sub-chain node 100 is, for example, a computer or a server machine operated in the business operator system 10-1. The other business operator systems 10 may also include respective local networks similar to the business operator system 10-1.

The consortium server 200 is a communication apparatus that provides a check program to the sub-chain node 100, and is, for example, a computer or a server machine.

The check program is a program for performing check processing that includes checking processing (for example, acquisition, delivery, and modification) on data executed by the sub-chain node 100 and recording what kind of processing has been performed as a history. A processor or the computer included in the sub-chain node 100 implements the check processing described above by executing the check program.

The consortium server 200 delivers a check program to the sub-chain node 100 in response to a request from the sub-chain node 100. The consortium server 200 communicates with the sub-chain node 100 via the blockchain node 11, the blockchain network 20, or another network (not illustrated), and delivers the check program by transmitting the check program to the sub-chain node 100.

In the communication system 1, the business operator system 10-1 modifies a part of data by using the sub-chain node 100. At this time, the sub-chain node 100 requests the consortium server 200 for the check program. The sub-chain node 100 executes processing on data after executing the check program. Thus, the check program may check the processing on the data. The sub-chain node 100 executes the check program to generate a history of processing on the data. A signature of the consortium server 200 is given to this history by the execution of the check program. By giving this signature, the history may be proved to be a history authenticated by the consortium server 200, and the reliability is improved.

In FIG. 1, the sub-chain node 100 is described as a different communication apparatus from the blockchain node 11, but may be the same apparatus. Although a case where the sub-chain node 100 executes data processing will be described below as an example, similar processing may be applied to a case where the blockchain node 11 executes data processing. In a case where the blockchain node 11 executes data processing, the reliability of the processing of the blockchain node 11 may be improved.

Configuration Example of Consortium Server 200

Figure 2:
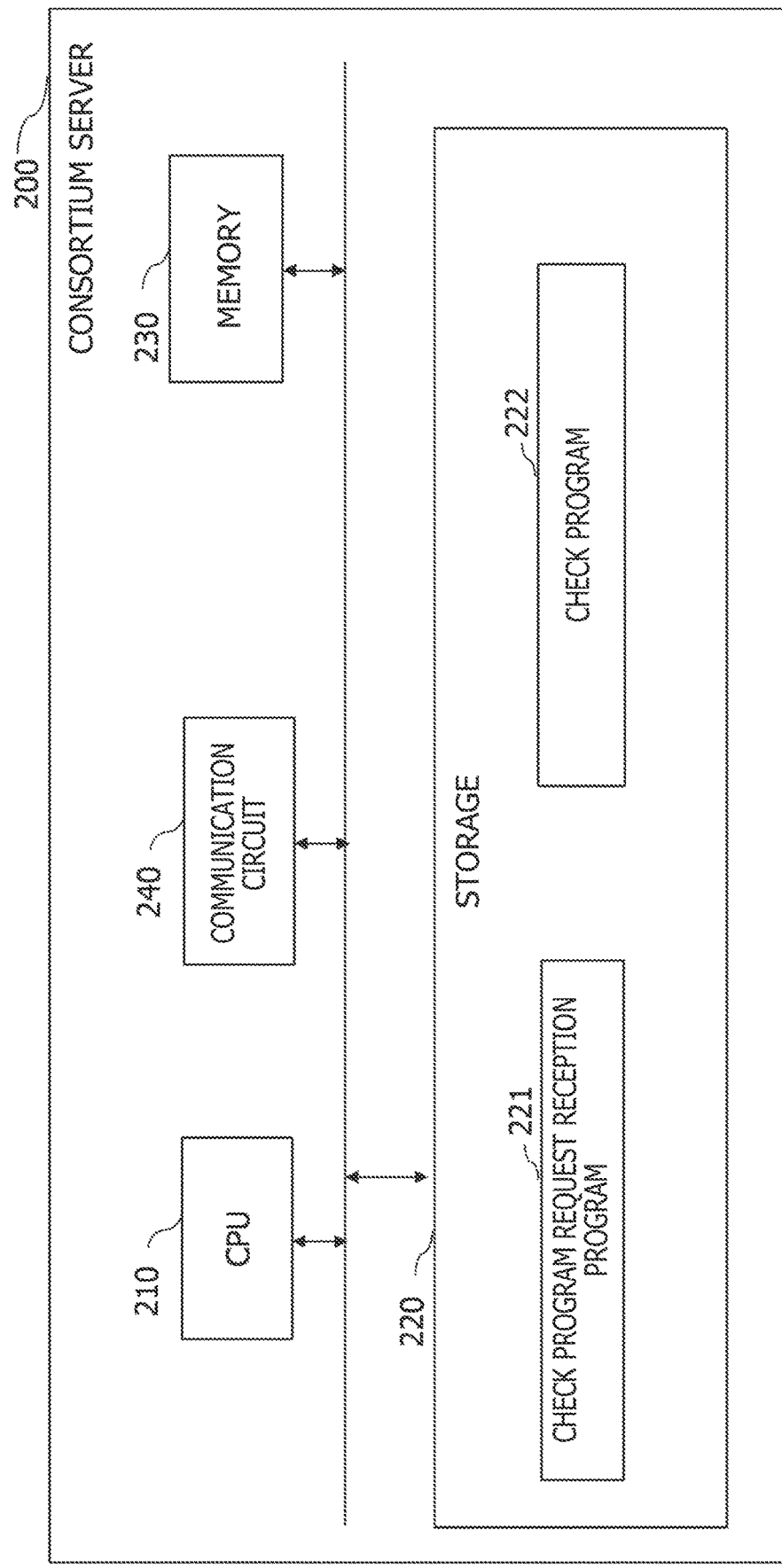
FIG. 2 is a diagram illustrating a configuration example of a consortium server.

FIG. 2 is a diagram illustrating a configuration example of the consortium server 200. The consortium server 200 includes a central processing unit (CPU) 210, a storage 220, a memory 230, and a communication circuit 240, and is, for example, a server machine.

The storage 220 is an auxiliary storage device, such as a flash memory, a hard disk drive (HDD), a solid-state drive (SSD), and the like for storing programs or data. The storage 220 stores a check program request reception program 221 and a check program 222. The check program 222 is a program executed by the sub-chain node 100, and is a program for verifying (checking) data processing executed by the sub-chain node 100.

The memory 230 is an area in which a program stored in the storage 220 is loaded. The memory 230 may also be used as an area in which a program stores data.

The CPU 210 is a processor that loads a program stored in the storage 220 into the memory 230, executes the loaded program, constructs each unit, and implements each processing.

The communication circuit 240 is a circuit that communicates with other devices. The communication circuit 240 transmits and receives data to and from other devices via a network. The communication circuit 240 is, for example, a network interface card (NIC).

By executing the check program request reception program 221, the CPU 210 constructs a transmission unit and a reception unit to perform check program request reception processing. The check program request reception processing is processing executed when a check program request for requesting delivery (transmission) of a check program is received from the sub-chain node 100 or the blockchain node 11. In the check program request reception processing, the consortium server 200 generates a secret key and a public key, gives the secret key to the check program, and transmits the check program to the sub-chain node 100.

Configuration Example of Sub-Chain Node 100

Figure 3:
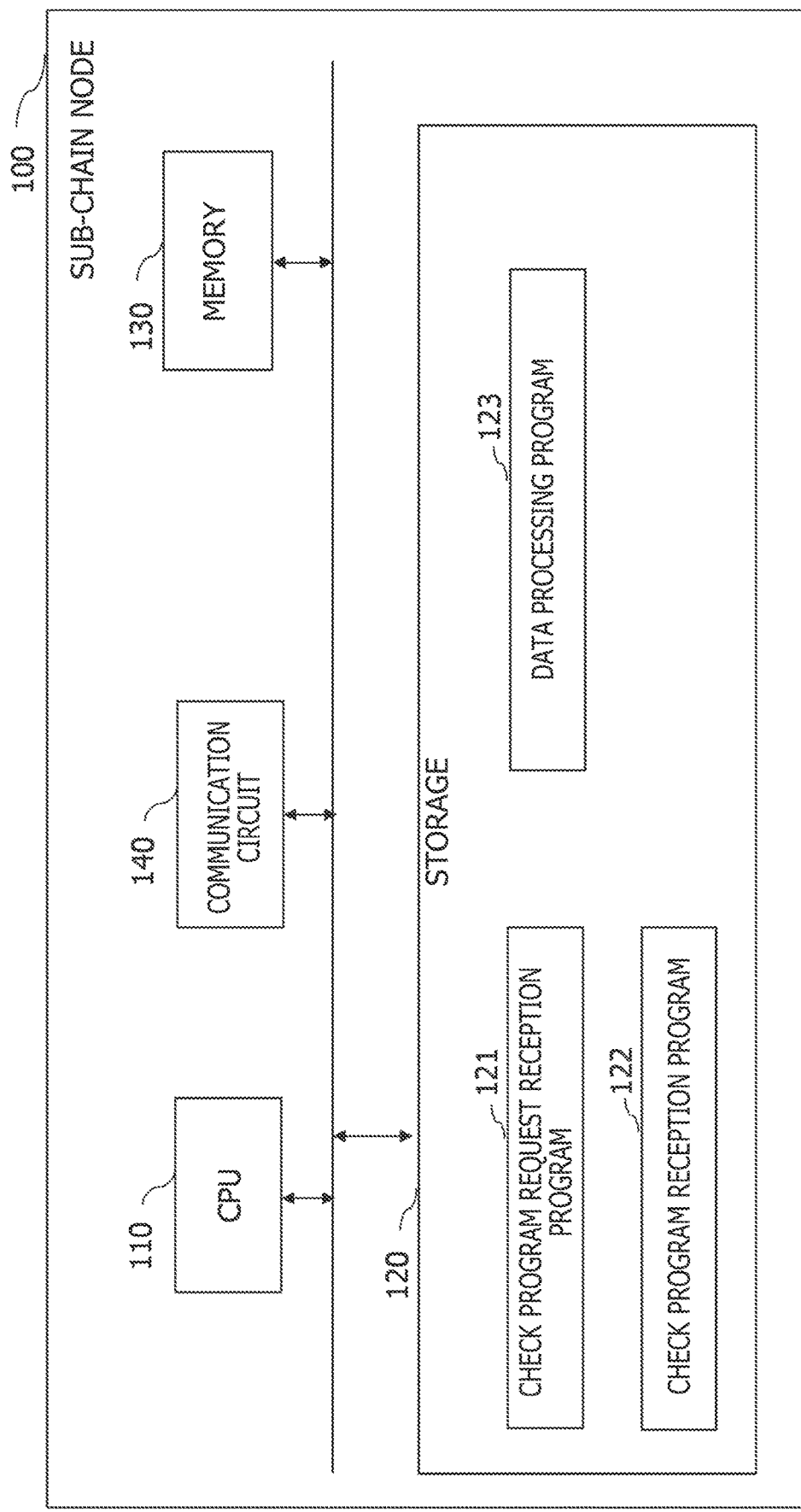
FIG. 3 is a diagram illustrating a configuration example of a sub-chain node.

FIG. 3 is a diagram illustrating a configuration example of the sub-chain node 100. The sub-chain node 100 is, for example, a communication apparatus including a CPU 110, a storage 120, a memory 130, and a communication circuit 140.

The storage 120 is an auxiliary storage device, such as a flash memory, an HDD, and an SSD, for storing programs or data. The storage 120 stores a check program request program 121, a check program reception program 122, and a data processing program 123.

The memory 130 is an area in which a program stored in the storage 120 is loaded. The memory 130 may also be used as an area in which a program stores data.

The CPU 110 is a processor that loads a program stored in the storage 120 into the memory 130, executes the loaded program, constructs each unit, and implements each processing.

The communication circuit 140 is a circuit that communicates with other devices. The communication circuit 140 transmits and receives data to and from other devices via a network. The communication circuit 140 is, for example, a NIC or a wireless communication circuit.

By executing the check program request program 121, the CPU 110 constructs a request unit and performs check program request processing. The check program request processing is processing of transmitting a check program request to the consortium server 200, and is executed as, for example, preprocessing for executing data processing. The check program request processing may be performed by, for example, the blockchain node 11.

By executing the check program reception program 122, the CPU 110 constructs an acquisition unit and a check unit and performs check program reception processing. The check program reception processing is processing performed when the check program is acquired from the consortium server 200. In the check program reception processing, the sub-chain node 100 executes the check program and verifies data processing. The sub-chain node 100 gives a signature to the verification result (check result) and publishes the verification result with the signature in the blockchain.

By executing the data processing program 123, the CPU 110 constructs a data processing unit and performs data processing. The data processing is processing on data, and is, for example, processing of performing check-in, check-out, and modification (including deletion, integration, K-anonymization, and the like) of data.

Data Processing

Figure 4:
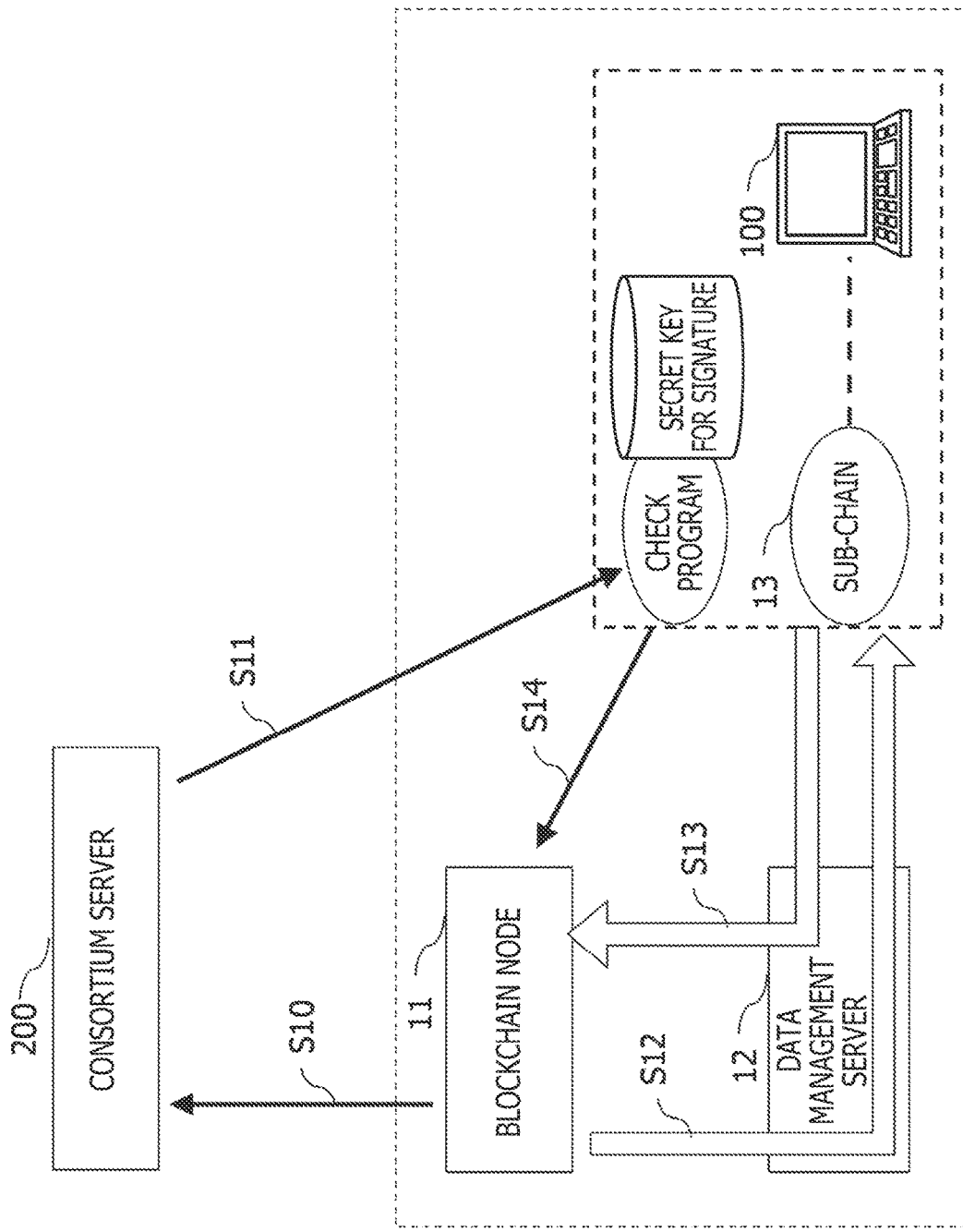
FIG. 4 is a diagram illustrating an example of a sequence of data processing by a sub-chain node.

FIG. 4 is a diagram illustrating an example of a sequence of data processing by the sub-chain node 100. When performing data processing on certain data in the sub-chain network, the blockchain node 11 transmits a check program request to the consortium server 200 (S10).

Figure 5:
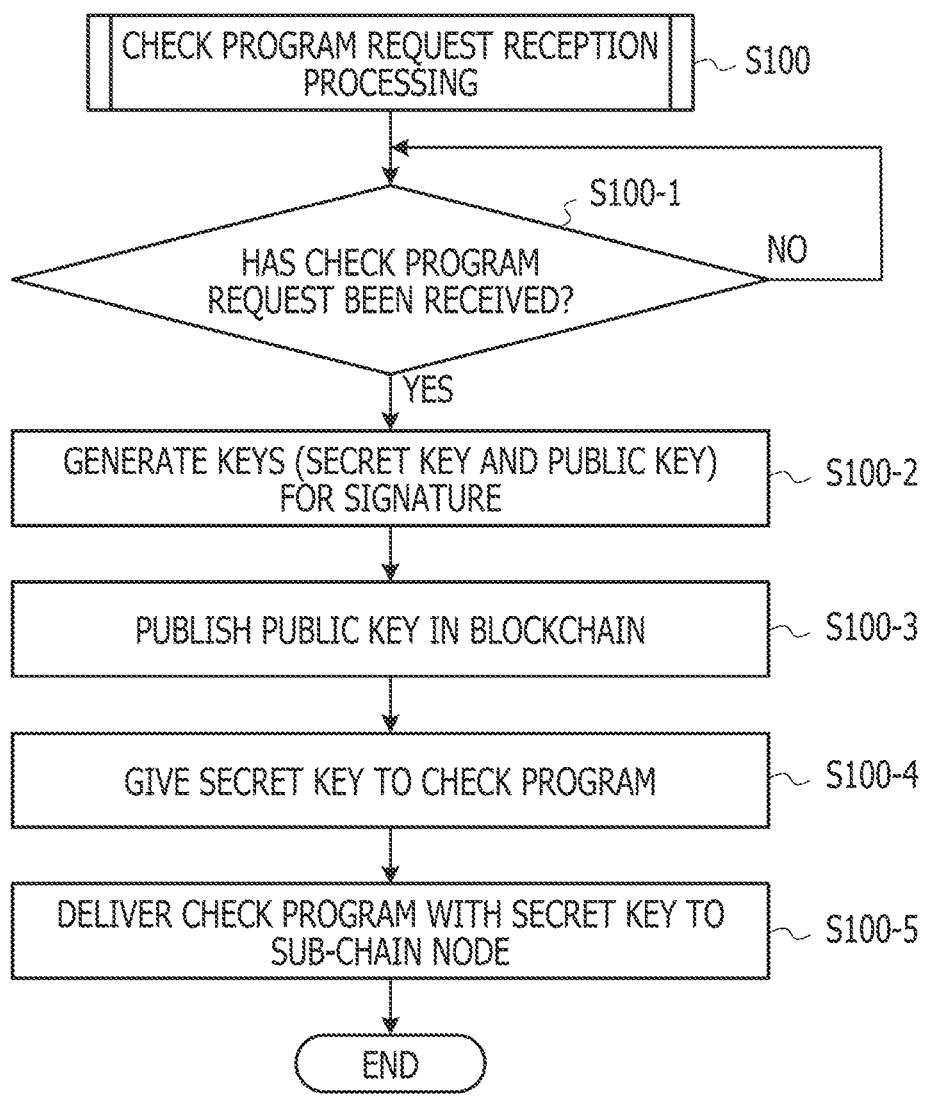
FIG. 5 is a diagram illustrating an example of a processing flowchart of check program request reception processing.

Upon receiving the check program request (S10), the consortium server 200 performs check program request reception processing (S100 in FIG. 5).

FIG. 5 is a diagram illustrating an example of a processing flowchart of the check program request reception processing S100. The consortium server 200 waits for reception of the check program request (No in S100-1).

Upon receiving the check program request (Yes in S100-1), the consortium server 200 generates keys (public key and secret key) for a signature (S100-2). The consortium server 200 publishes the public key in the blockchain (S100-3). The publication of the public key in the blockchain is, for example, storing the public key in the blockchain node 11.

The consortium server 200 gives a secret key to the check program (S100-4). The check program is a program that may be used in the sub-chain of the business operator system 10, and is prepared in advance and stored in an internal memory or the like of the consortium server 200, for example.

The consortium server 200 delivers the check program with the secret key to the sub-chain node 100 of the blockchain node 11 that requests the check program (S100-5), and ends the processing.

Referring back to the sequence of FIG. 4, in the check program request reception processing S100, the consortium server 200 delivers the check program with the secret key to the sub-chain node 100 (S11 and S100-5 in FIG. 5). Upon receiving the check program, the sub-chain node 100 performs check program reception processing (S200 in FIG. 6).

Figure 6:
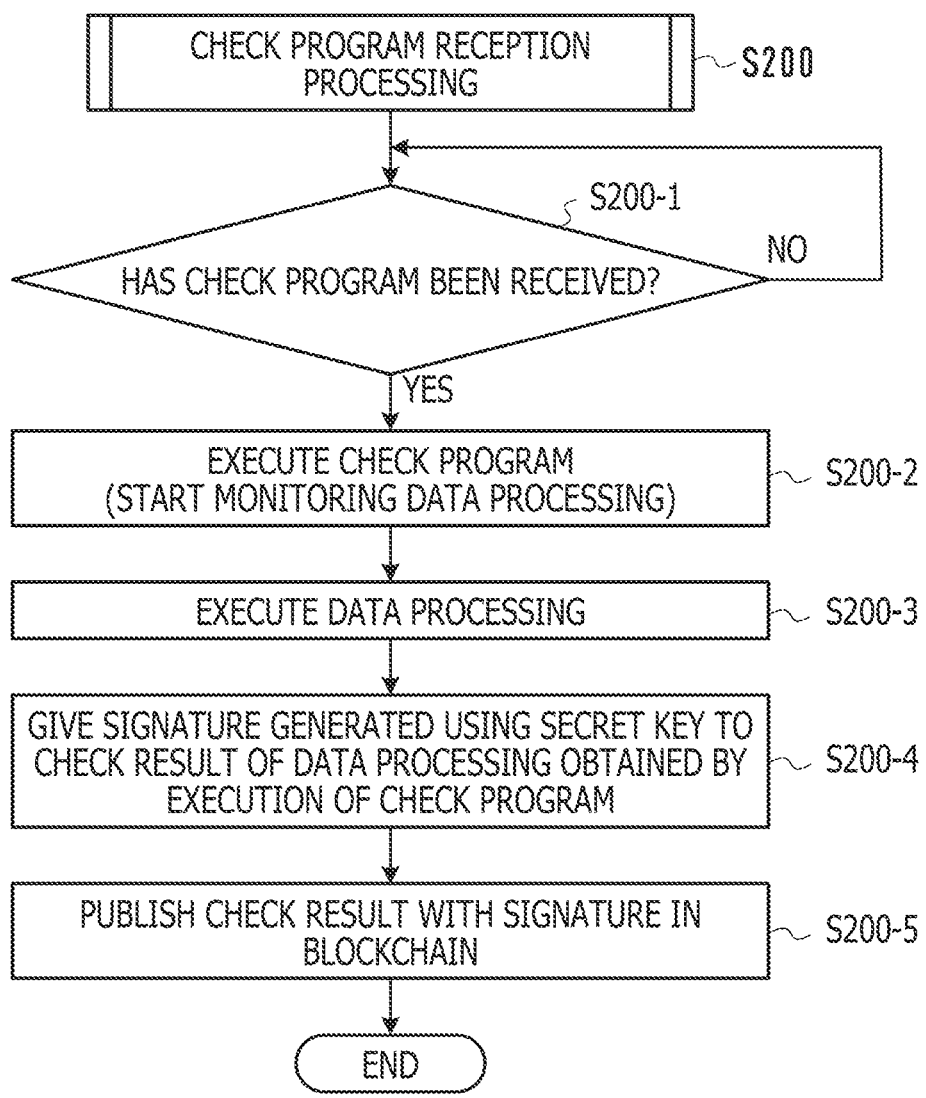
FIG. 6 is a diagram illustrating an example of a processing flowchart of check program reception processing.

FIG. 6 is a diagram illustrating an example of a processing flowchart of the check program reception processing S200. In the check program reception processing S200, the sub-chain node 100 waits for reception of the check program (No in S200-1). Upon receiving the check program (Yes in S200-1), the sub-chain node 100 executes the check program (S200-2). By executing the check program, monitoring of data processing is started. The sub-chain node 100 may confirm the signature of the check program before the processing S200-2. In a case where the signature is not correct, the check program may be requested again.

The sub-chain node 100 executes data processing (S200-3). At this time, since the monitoring of the data processing has been started in the processing S200-2, the check result (for example, history information indicating what kind of data processing has been executed) of the data processing in the processing S200-3 is recorded by the check program.

The sub-chain node 100 gives a signature generated using the secret key, which has been given to the check program, to the check result of the data processing obtained by executing the check program (S200-4).

The sub-chain node 100 stores the check result with the signature in the blockchain (S200-5), and ends the processing. The storing in the blockchain is, for example, storing the check result with the signature in the distributed ledger included in the blockchain node 11. The distributed ledger, which stores the check result with the signature, is synchronized between the blockchain nodes 11, and the equivalent details are shared with other blockchain nodes 11.

Referring back to the sequence in FIG. 4, the sub-chain node 100 executes the check program in the check program reception processing S200 (S200-2 in FIG. 6). As the data processing (S200-3 in FIG. 6), the sub-chain node 100 acquires data by check-out of the blockchain node 11 (S12), modifies the data, and delivers the modified data to the blockchain node 11 by check-in of the blockchain node 11 (S13).

The sub-chain node 100 gives a signature to the check result obtained by the check program and delivers the check result with the signature to the blockchain node 11 (S14 and S200-4 in FIG. 6).

In the first embodiment, the sub-chain node 100 checks the data processing performed in a local environment such as the sub-chain network by using the check program acquired from the consortium server 200. Other sub-chain nodes may confirm the validity of the data processing executed in the local environment by confirming the check result which is published in the blockchain and to which the signature generated using the secret key issued by the consortium server 200 is given. The other sub-chain nodes may confirm the signature with the public key.

Example of Check by Check Program

Figure 7:
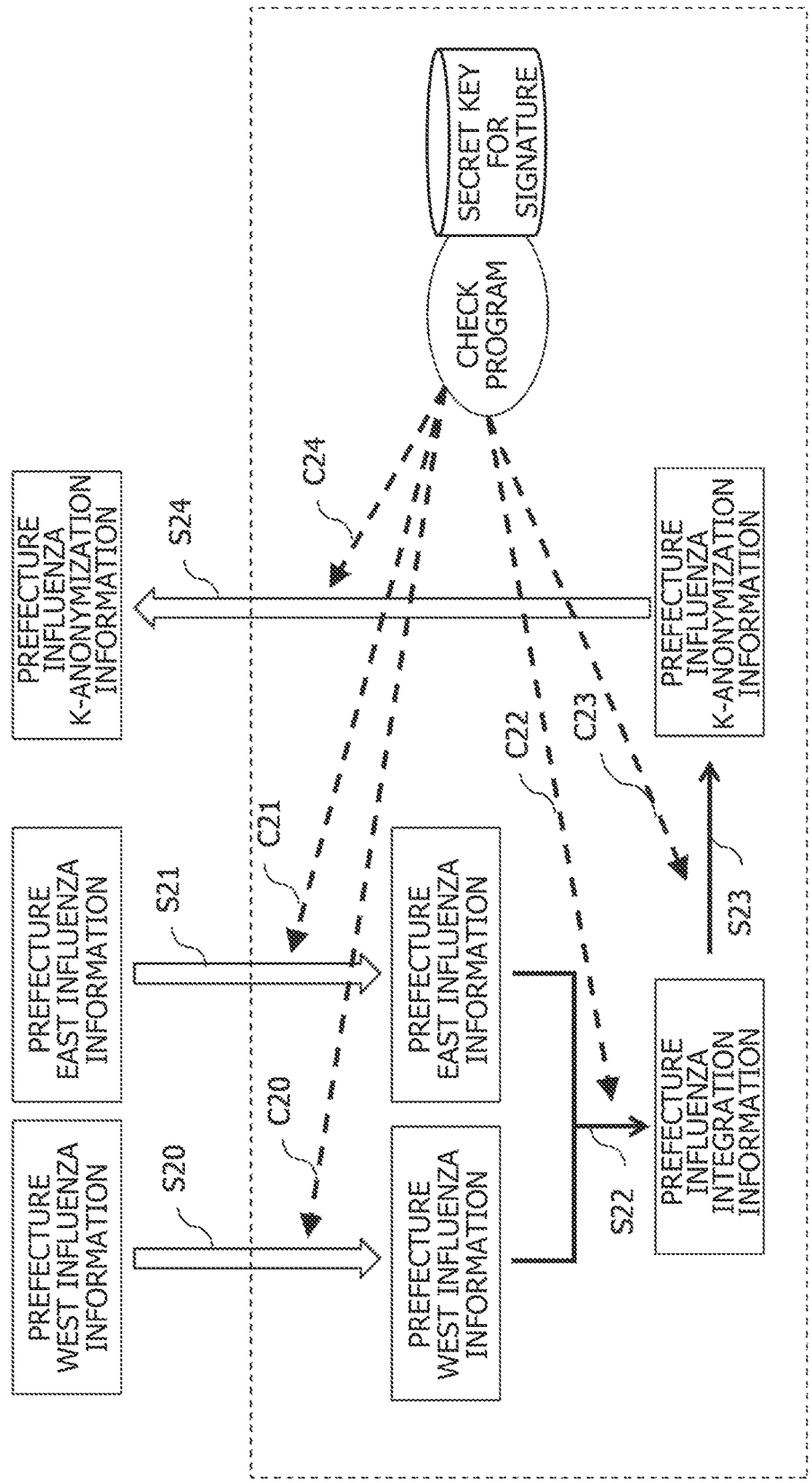
FIG. 7 is a diagram illustrating an example of a sequence in a case where data is influenza information.

Examples of a check by the check program are described. FIG. 7 is a diagram illustrating an example of a sequence in a case where data is influenza information. In FIG. 7, the sub-chain node 100 uses prefecture West influenza information and prefecture East influenza information as input data, and outputs prefecture influenza K-anonymization information obtained by K-anonymization. In a case of personal information, K-anonymization indicates, for example, performing anonymization to an extent that an individual may not be identified.

The sub-chain node 100 acquires prefecture West influenza information by check-out of the blockchain node 11 (S20). The sub-chain node 100 acquires prefecture East influenza information by check-out of the blockchain node 11 (S21).

The sub-chain node 100 integrates the prefecture West influenza information and the prefecture East influenza information and generates prefecture influenza integration information (S22).

The sub-chain node 100 performs K-anonymization on the prefecture influenza integration information and generates prefecture influenza K-anonymization information (S23).

The sub-chain node 100 delivers the prefecture influenza K-anonymization information to the blockchain node 11 by check-in of the blockchain node 11 (S24).

By executing the check program, the sub-chain node 100 checks the processing S20 to S24 and generates a check result.

A check C20 is a check for the processing S20 and is a checked-out-content check. The checked-out-content check is a check for confirming whether the checked-out data is transmitted correctly. For example, in the checked-out-content check, data before check-out and data after check-out are compared, and when the data before check-out and the data after check-out are the same, it is determined that the checked-out data is transmitted correctly.

A check C21 is a check for the processing S21 and is the checked-out-content check.

A check C22 is a check for the processing S22 and is a data integration check. The data integration check is a check for confirming whether the data is integrated correctly. In the data integration check, for example, it is confirmed whether or not all the records of a plurality of pieces of data to be integrated are reflected in the integrated data, and it is determined that the data is correctly integrated when all the records are reflected.

A check C23 is a check for the processing S23 and is a K-anonymization check. The K-anonymization check is a check for confirming whether the data is anonymized correctly. In the K-anonymization check, for example, a record of data after K-anonymization and a record before K-anonymization are compared with each other based on the processing details of K-anonymization, and it is confirmed whether there is either excess or deficiency. In a case where there is neither excess nor deficiency, it is determined that K-anonymization is correctly performed. Since a record may be deleted depending on the processing details of K-anonymization, in a case where it is determined that the record is to be deleted, it is determined that K-anonymization has been correctly performed even when there is excess or deficiency.

A check C24 is a check for the processing S24 and is a checked-in-content check. The checked-in-content check is a check for confirming whether the checked-in data is transmitted correctly. For example, in the checked-in-content check, data before check-in and data after check-in are compared, and when the data before check-in and the data after check-in are the same, it is determined that the data is transmitted correctly.

The sub-chain node 100 checks the data processing by executing the check program, and stores each check result in the blockchain node 11 with a signature. Since data processing determined to be NG by the check program is inappropriate data processing, in a case where the check result is NG, the sub-chain node 100 may discard the data generated in the processing and restore the data before the generation.

In the example of each check described above, the check is determining whether the data processing is correct. However, for example, the check may be recording the details of the data processing as the check result. Each blockchain node 11 may determine whether or not correct data processing has been performed by confirming the details of the data processing.

Second Embodiment

Next, a second embodiment is described. In the second embodiment, for a part of processing, the consortium server 200 delivers a processing program corresponding to each data processing to the sub-chain node 100 instead of a check program.

Figure 8:
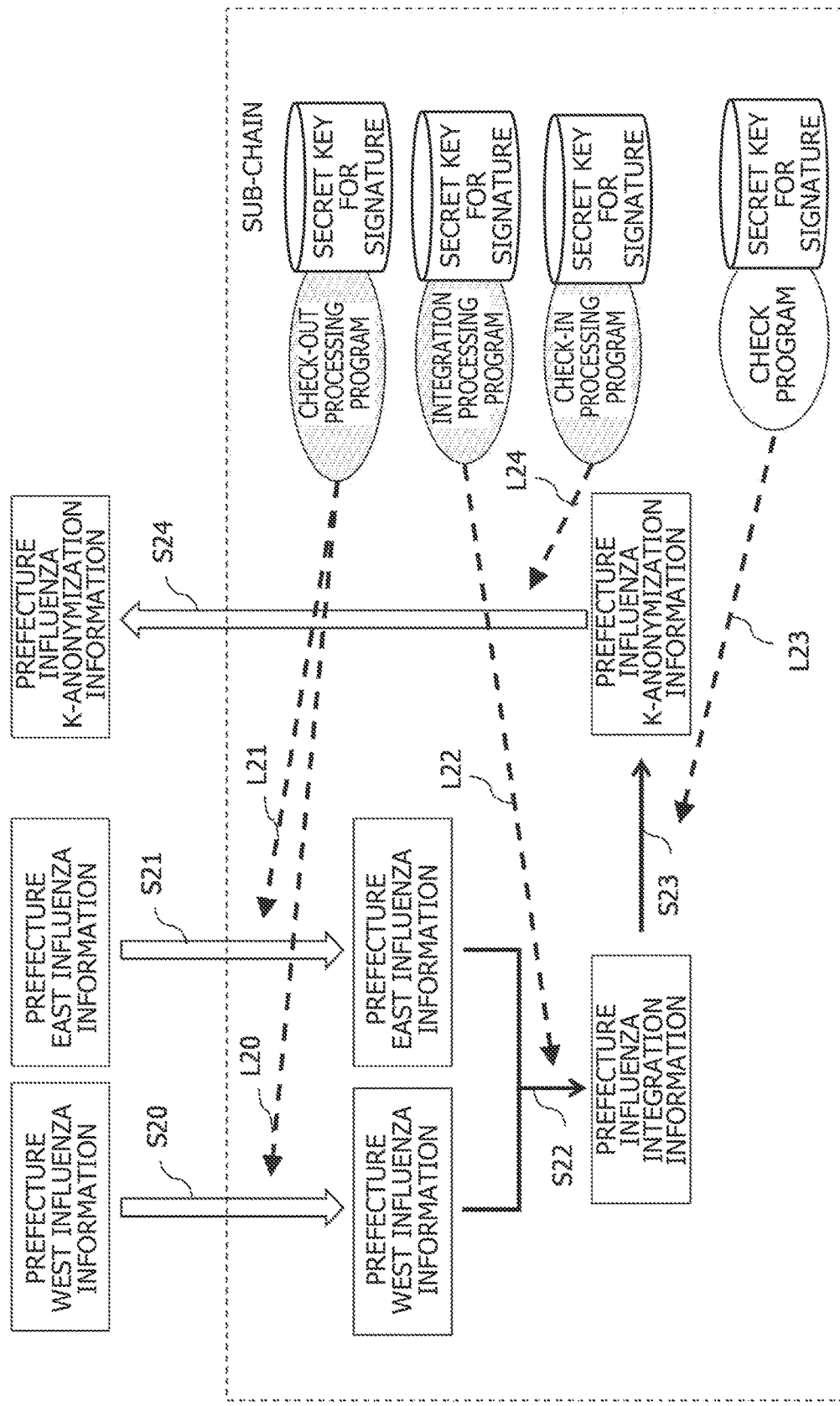
FIG. 8 is a diagram illustrating an example of a sequence in a case where a part of processing is executed by using a processing program.

FIG. 8 is a diagram illustrating an example of a sequence in a case where a part of processing is executed by a processing program. The details of the data processing are the same as those in the sequence illustrated in FIG. 7.

Before executing data processing, the sub-chain node 100 acquires a check-out processing program, an integration processing program, a check-in processing program, and a check program from the consortium server 200. Secret keys for a signature are given to the check-out processing program, the integration processing program, the check-in processing program, and the check program, respectively.

The sub-chain node 100 executes the processing S20 and S21 by using the check-out processing program (L20 and L21). By executing the check-out processing program, check-out processing is correctly executed. The sub-chain node 100 gives a signature to the execution result of the check-out processing program and delivers the execution result with the signature to the blockchain node 11 to publish the execution result with the signature in the blockchain.

The sub-chain node 100 executes the processing S22 by using the integration processing program (L22). By executing the integration processing program, integration processing is correctly executed. The sub-chain node 100 gives a signature to the execution result of the integration processing program and delivers the execution result with the signature to the blockchain node 11 to publish the execution result with the signature in the blockchain.

The sub-chain node 100 executes the processing S24 by using the check-in processing program (L24). By executing the check-in processing program, check-in processing is correctly executed. The sub-chain node 100 gives a signature to the execution result of the check-in processing program and delivers the execution result with the signature to the blockchain node 11 to publish the execution result with the signature in the blockchain.

In this manner, part of processing (check-out, check-in, and integration) is executed by using programs acquired from the consortium server 200. However, on the other hand, K-anonymization (processing S23) is checked by using a check program (L23). In the K-anonymization, since a degree of anonymization and a method of anonymization vary, and it is up to the business operator to determine which method to use and how much to anonymize, it is difficult to prepare a common processing program in the consortium server 200. Since processing with low versatility such as K-anonymization has different execution details depending on the business operator, such processing is not executed by a processing program acquired from the consortium server 200 and is checked by the check program. For example, only processing for performing the same thing in all business operator systems may be executed by a processing program acquired from the consortium server 200. The check result of K-anonymization processing is published with a signature in the blockchain as in the first embodiment.

Third Embodiment

A third embodiment is described. In the third embodiment, the sub-chain node 100 uses the same check program a plurality of times (or during a first time period). Each time the check program is used (or every second time period), the sub-chain node 100 acquires a processing identifier from the consortium server 200. The processing identifier may be acquired for each data unit for which data processing is performed. For example, one processing identifier is acquired for a series of data processing up to the generation of the prefecture influenza K-anonymization information described in the example of the first embodiment. For example, the processing identifier may be acquired as one unit of a series of data processing until target data is generated.

Figure 9:
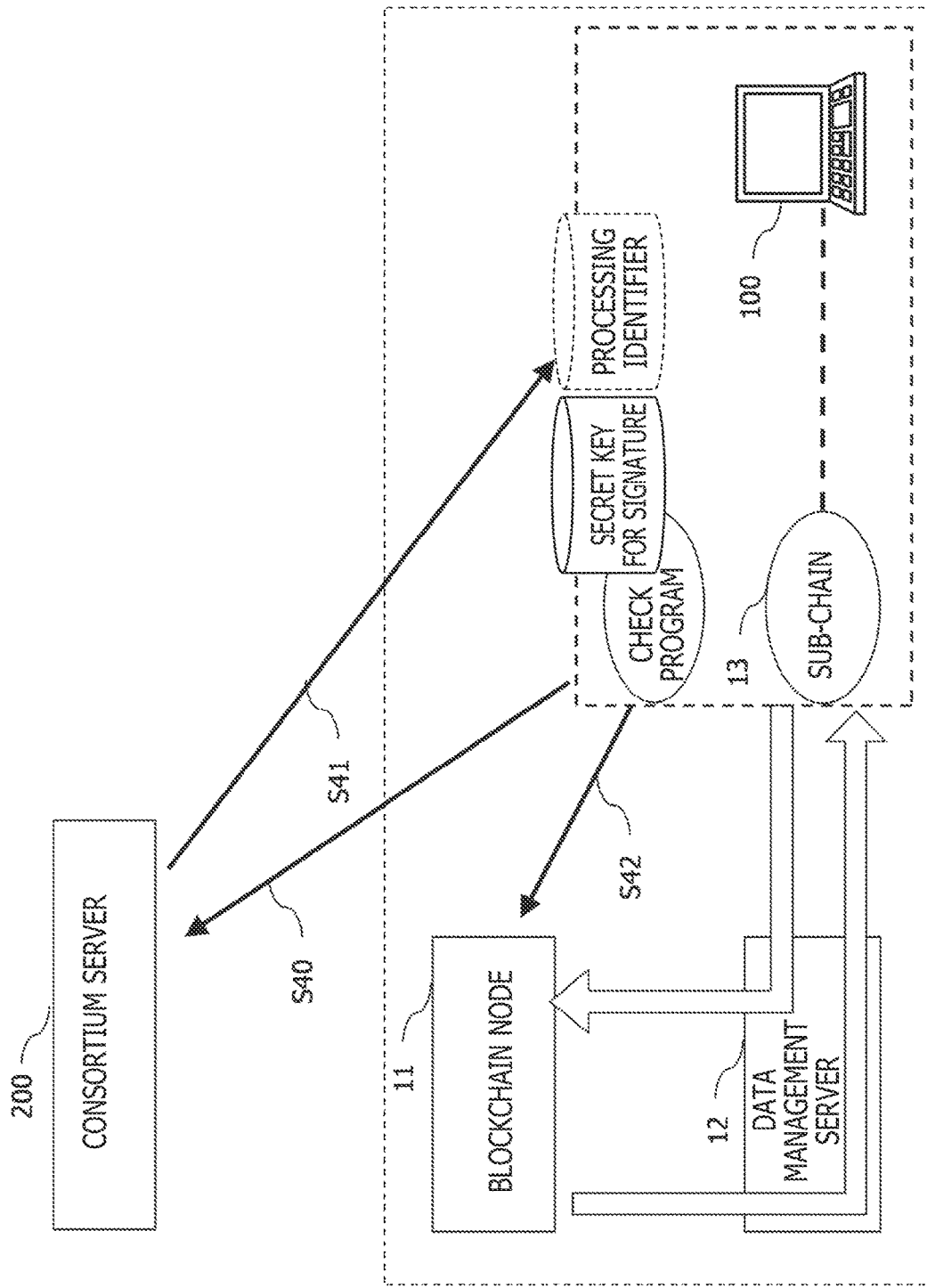
FIG. 9 is a diagram illustrating an example of a sequence of data processing by a sub-chain node.

FIG. 9 is a diagram illustrating an example of a sequence of data processing by the sub-chain node 100. The data processing is the same as that in the sequence in FIG. 4, and therefore the description thereof is omitted.

The sub-chain node 100 (or the blockchain node 11) transmits a processing identifier request for requesting a processing identifier to the consortium server 200 (S40).

Upon receiving the processing identifier request (S40), the consortium server 200 generates a processing identifier, encrypts the processing identifier with, for example, a public key, and delivers the processing identifier to the sub-chain node 100 (S41).

The sub-chain node 100 performs decryption by using a secret key and acquires the processing identifier. The data processing is performed, a signature using the processing identifier is given to the check result, and the check result with the signature is published in the blockchain.

The processing identifier is a hash value obtained by hashing a numerical value generated from a user identifier, a serial number, a random number, or the like by using a hash function. The processing identifier may be any other than the hash value as long as it is a unique value that may not be inferred from an outside.

Figure 10:
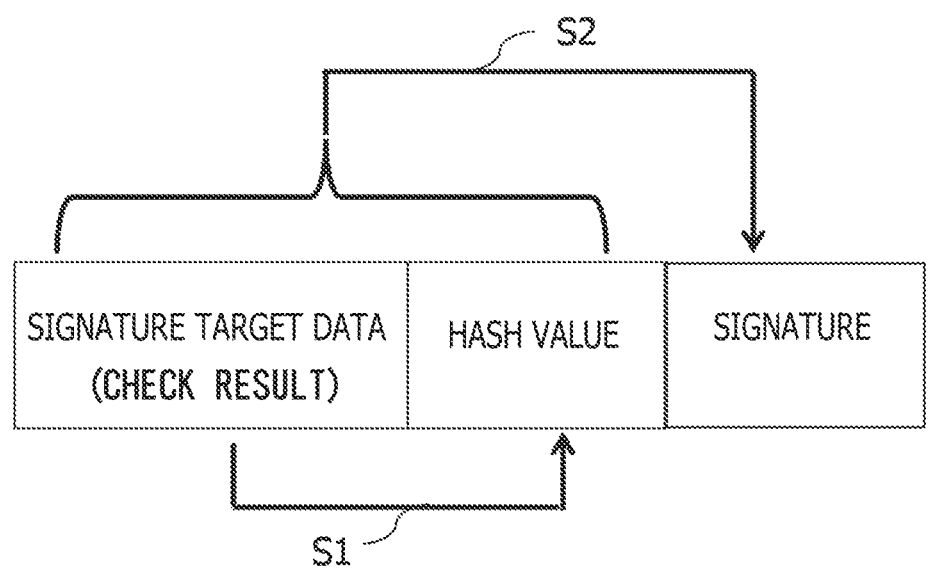
FIG. 10 is a diagram illustrating an example of a signature of a check result.

FIG. 10 is a diagram illustrating an example of a signature of a check result. The sub-chain node 100 obtains a hash value for the check result, which is a signature target, by using the processing identifier (S1), generates a signature of the signature target to which the calculated hash value is added (S2), and gives the signature to the check result with the hash value.

Other blockchain nodes 11 may separate data related to the check result, to which the signature is given, into the hash value and other information, obtain a hash value for the other information by using the processing identifier as a key, and compare the two hash values with each other, thereby determining that the other information is a result of processing by a proper check program.

Although the check program is described as an example in the present embodiment, the processing programs described in the second embodiment may be used a plurality of times by performing similar processing.

Other Embodiments

In order to improve the reliability in the communication system 1, it is further desired to improve security of a secret key for a signature. FIG. 11 is a diagram illustrating an example of a method of concealing a secret key for a signature.

The consortium server 200 divides a secret key for a signature into plural key fragments (S50), gives redundant data to the plural key fragments to generate redundant key data, and stores the redundant key data in a memory (S51). The consortium server 200 encrypts the redundant key data by using a public key of a user (a key different from a public key for a signature) to generate encrypted information (S52) and transmits the encrypted information to the sub-chain node 100.

The sub-chain node 100 decrypts the encrypted information by using a secret key of the user (a key different from the secret key for a signature) to acquire the redundant key data (S53), deletes the redundant data from the redundant key data to acquire the plural key fragments, and combines the plural key fragments to acquire the secret key for a signature (S54). In this manner, the secret key for a signature may be more safely delivered.

Although the sub-chain node 100 executes the data processing or the check program in the above-described embodiments, the blockchain node 11 may execute the data processing and the check program, for example.

According to one aspect, it is possible to improve a reliability of a history of processing executed by a business operator on data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program that causes a computer to execute a process, the process comprising:
acquiring, from a server in a blockchain network, a check program for checking data processing on data executed by a sub-chain node of a sub-chain network different than the blockchain network, the server authenticating reliability of the data processing by a signature of the server and the sub-chain network being a local network;
executing the check program;
giving a first signature of the server to a check result generated by executing the data processing during the execution of the check program;
publishing the check result with the first signature in the blockchain network;
receiving a processing program for executing a part of the data processing from the server:
executing the part of the data processing by using the processing program;
giving a second signature of the server to an execution result obtained by executing the processing program; and
publishing the execution result with the second signature in the blockchain network.

2. The non-transitory computer-readable recording medium according to claim 1, wherein
a secret key generated by the server is given to the check program,
a public key corresponding to the secret key is published in the blockchain network, and
the processing further comprises:
generating the first signature by using the secret key given to the check program.

3. The non-transitory computer-readable recording medium according to claim 2, wherein
the secret key given to the check program is encrypted information encrypted by the server, and
the processing further comprises:
acquiring the secret key by decrypting the encrypted information.

4. The non-transitory computer-readable recording medium according to claim 1, wherein
the part of the data processing is executed with same details in another communication apparatus.

5. The non-transitory computer-readable recording medium according to claim 1, the process further comprising:
acquiring a processing identifier from the server for each of one or more data processing; and generating the first signature for each of one or more data processing by using the acquired processing identifier.

6. The non-transitory computer-readable recording medium according to claim 5, wherein
the processing identifier is generated by using a hash function.

7. The non-transitory computer-readable recording medium according to claim 1, wherein
the data processing includes processing of modifying the data.

8. The non-transitory computer-readable recording medium according to claim 7, wherein
the data processing includes processing of acquiring the data from the blockchain network and processing of delivering the data after the data processing to the blockchain network.

9. The non-transitory computer-readable recording medium according to claim 1, wherein
the computer is in communication with the blockchain network.

10. A communication apparatus, comprising:
a memory; and
a processor coupled to the memory and the processor configured to:
acquire, from a server in a blockchain network, a check program for checking data processing on data executed by a sub-chain node of a sub-chain network different than the blockchain network, the server authenticating reliability of the data processing by a signature of the server and the sub-chain network being a local network;
execute the check program;
give a first signature of the server to a check result generated by executing the data processing during the execution of the check program; and
publish the check result with the first signature in the blockchain network;
receive a processing program for executing a part of the data processing from the server;
execute the part of the data processing by using the processing program;
give a second signature of the server to an execution result obtained by executing the processing program; and
publish the execution result with the second signature in the blockchain network.

11. A communication method, comprising:
acquiring, by a computer and from a server in a blockchain network, a check program for checking data processing on data executed by a sub-chain node of a sub-chain network different than the blockchain network, the server authenticating reliability of the data processing by a signature of the server and the sub-chain network being a local network;
executing the check program;
giving a first signature of the server to a check result generated by executing the data processing during the execution of the check program;
publishing the check result with the first signature in the blockchain network;
receiving a processing program for executing a part of the data processing from the server;
executing the part of the data processing by using the processing program;
giving a second signature of the server to an execution result obtained by executing the processing program; and
publishing the execution result with the second signature in the blockchain network.

* * * * *